United States Patent
Horihata

(10) Patent No.: US 8,874,813 B2
(45) Date of Patent: Oct. 28, 2014

(54) VEHICLE COMMUNICATION SYSTEM

(75) Inventor: Satoshi Horihata, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1063 days.

(21) Appl. No.: 12/934,777

(22) PCT Filed: Mar. 31, 2009

(86) PCT No.: PCT/JP2009/056687
§ 371 (c)(1),
(2), (4) Date: Sep. 27, 2010

(87) PCT Pub. No.: WO2009/123201
PCT Pub. Date: Oct. 8, 2009

(65) Prior Publication Data
US 2011/0035521 A1  Feb. 10, 2011

(30) Foreign Application Priority Data

Apr. 2, 2008 (JP) ................................. 2008-096599

(51) Int. Cl.
*G06F 5/00* (2006.01)
*H04L 12/46* (2006.01)
*H04L 12/40* (2006.01)

(52) U.S. Cl.
CPC ...... *H04L 12/4625* (2013.01); *H04L 12/40013* (2013.01)
USPC ........................................................ 710/60

(58) Field of Classification Search
CPC .............. G06F 13/42; G06F 3/00; G06F 5/00
USPC ........... 710/29, 30, 45, 60, 61, 106, 117, 124; 370/401, 432, 442, 470
See application file for complete search history.

(56) References Cited

U.S. PATENT DOCUMENTS 7,548,551 B2 * 6/2009 Kanajan ........................ 370/442
7,921,248 B2 * 4/2011 Brinksmeier et al. ........ 710/105
(Continued)

FOREIGN PATENT DOCUMENTS

JP  A-2005-328119  11/2005
JP  A-2006-180205   7/2006
(Continued)

OTHER PUBLICATIONS

Catalog *Introduction to CAN*, issued by Renesas Electronics Corporation, Apr. 1, 2010, pp. 1-44, vol. RJJ9Z0001-0400Z/Rev.4.00 (with translation).

(Continued)

*Primary Examiner* — Khanh Dang
(74) *Attorney, Agent, or Firm* — Oliff PLC

(57) ABSTRACT

A vehicle communication system comprising a relay connection unit for relaying one or more buses connected to a message transmitter and a bus connected to a message receiver, wherein the relay connection unit generates new messages on the basis of a plurality of messages received from the message transmitter and transmits the generated messages to the message receiver via the bus, and wherein the number of new messages to be generated is not less than 1, a plurality of the new messages allow the messages for generating each of the messages to be divided into groups, and the plurality of messages which the relay connection unit receives from the message transmitter to generate one new message gradually advance the transmission timing.

8 Claims, 11 Drawing Sheets

(56) References Cited

U.S. PATENT DOCUMENTS

| | | | |
|---|---|---|---|
| 2002/0006139 A1* | 1/2002 | Kikkawa et al. | 370/502 |
| 2005/0135404 A1* | 6/2005 | Zumsteg et al. | 370/442 |
| 2005/0254518 A1 | 11/2005 | Fujimori | |
| 2006/0004545 A1* | 1/2006 | Souda | 702/188 |
| 2006/0013237 A1* | 1/2006 | Furuta et al. | 370/401 |
| 2006/0143345 A1* | 6/2006 | Fredriksson | 710/106 |
| 2007/0206603 A1* | 9/2007 | Weich et al. | 370/395.4 |
| 2008/0218246 A1* | 9/2008 | Kanazawa et al. | 327/415 |
| 2010/0042290 A1* | 2/2010 | Isoyama | 701/35 |
| 2010/0103859 A1* | 4/2010 | Isoyama | 370/315 |
| 2010/0303133 A1* | 12/2010 | Isoyama et al. | 375/211 |
| 2010/0325639 A1* | 12/2010 | Isoyama | 719/313 |
| 2011/0128855 A1* | 6/2011 | Ando et al. | 370/236 |
| 2011/0208884 A1* | 8/2011 | Horihata | 710/105 |

FOREIGN PATENT DOCUMENTS

| | | |
|---|---|---|
| JP | A-2007-129467 | 5/2007 |
| JP | A-2007-174180 | 7/2007 |
| WO | WO 2009/069472 A1 | 6/2009 |

OTHER PUBLICATIONS

International Search Report issued in International Application No. PCT/JP2009/056687 on Jun. 16, 2009 (with translation).

Japanese Office Action issued in Japanese Application No. 2010-505943 on Nov. 15, 2011 (with translation).

* cited by examiner

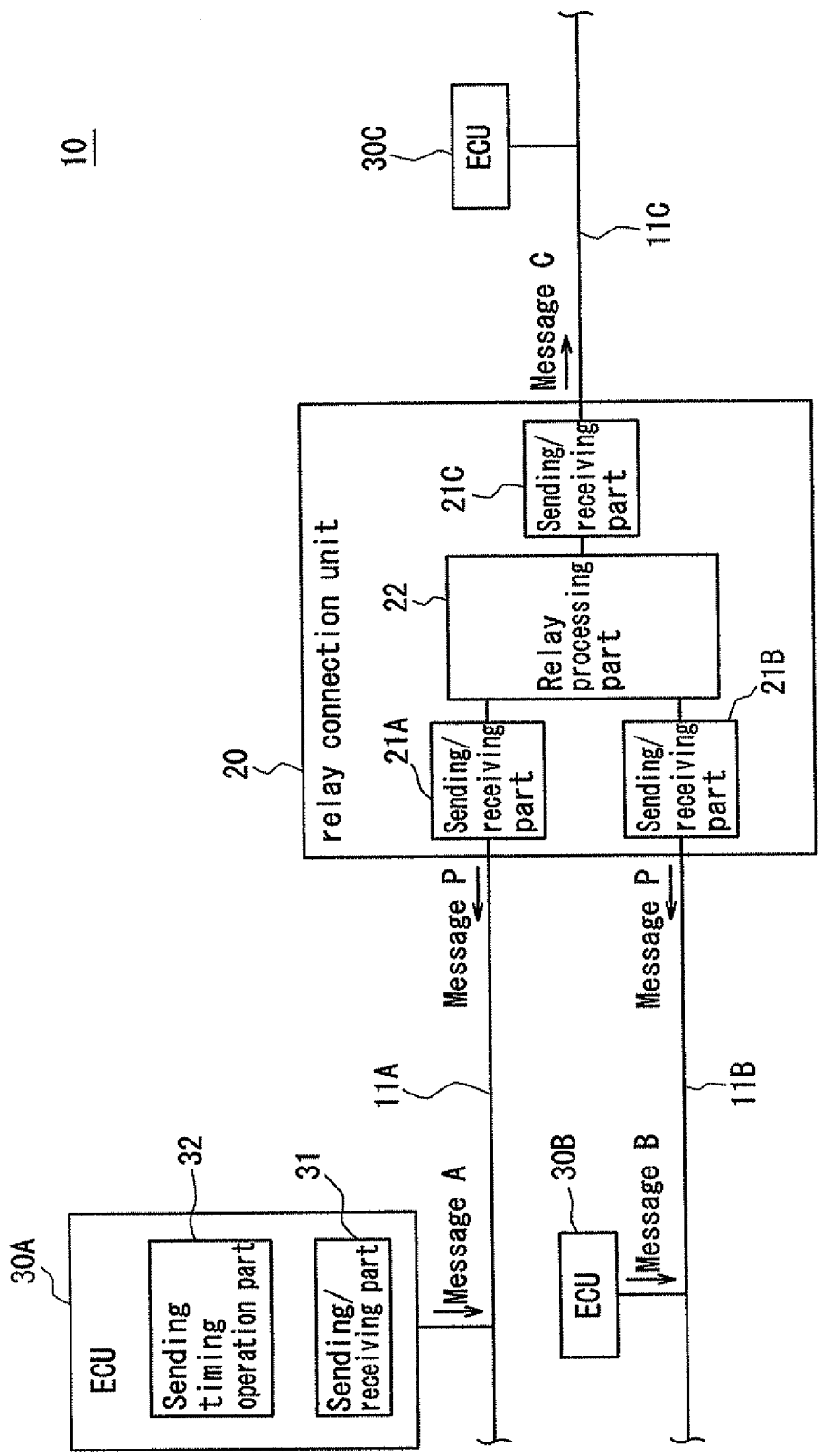

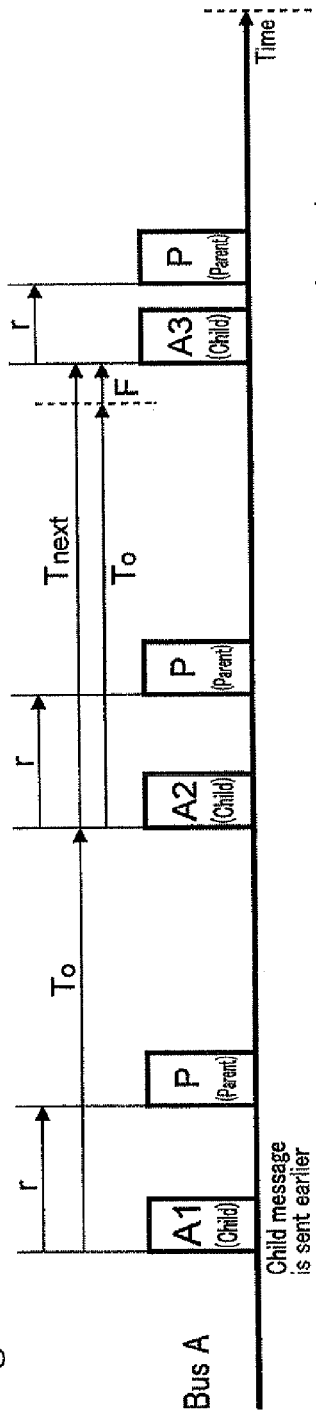
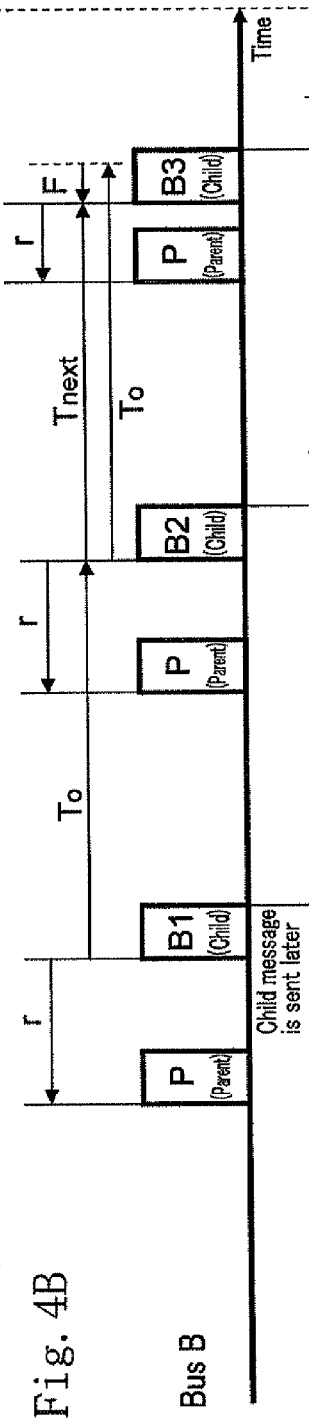
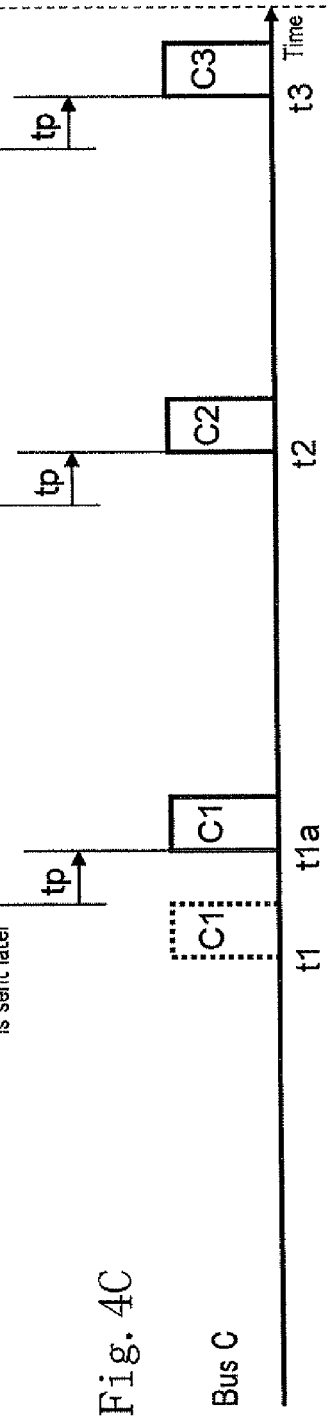

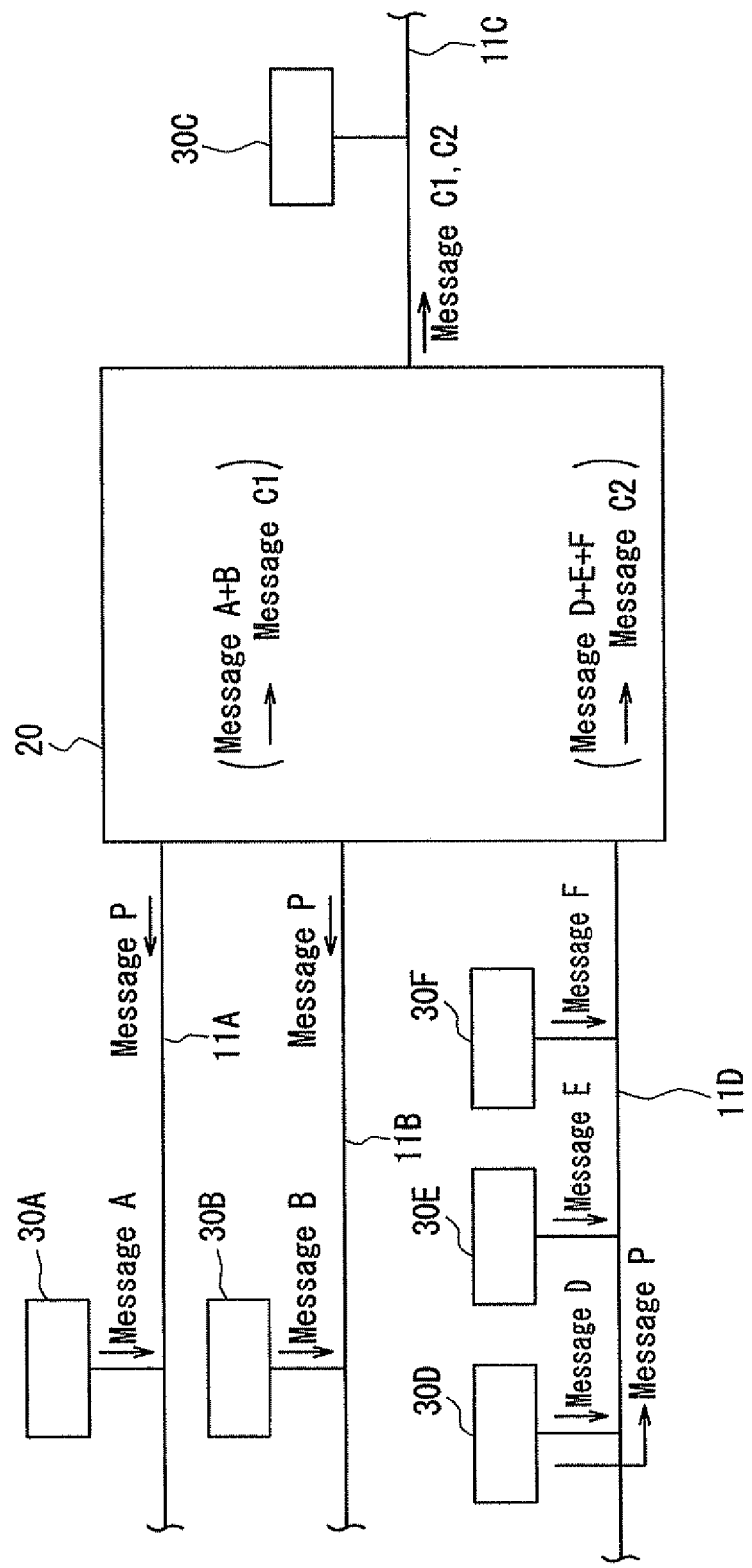

VEHICLE COMMUNICATION SYSTEM

FIELD OF THE INVENTION

The present invention relates to a vehicle communication system. More particularly, when a relay connection unit generates a new message based on messages received from message transmitters such as an electronic control unit, a sensor, and the like via buses and sends the new message to a message receiver such as a different electronic control unit, delay in the sending timing of the messages, sent from the message transmitters, for generating the new message is prevented.

DESCRIPTION OF THE RELATED ART

Conventionally in a vehicle, there is adopted a vehicle communication system in which electronic control units (hereinafter referred to as ECU) controlling the operations of devices mounted on the vehicle are connected to buses for multiple communication, and the buses are connected to each other via a relay connection unit (gateway) which relays messages sent and received among the ECUs belonging to different buses.

As the communication protocol of the vehicle communication system, CAN (Controller Area Network) shown in a non-patent document 1 is becoming the standard. The CAN is an asynchronous communication allowing any of the ECUs to send messages when the bus is in an open state.

The following case is known: the relay connection unit is connected to a plurality of buses. The relay connection unit periodically receives messages from message transmitters consisting of ECUs and sensors respectively connected to different buses. The relay connection unit generates new messages from specific bit information of the received messages and sends the generated messages to other buses.

The following case is also known: when a plurality of message transmitters are connected to one bus, the relay connection unit periodically receives messages from a plurality of the message transmitters via one bus and generates new messages.

As described above, the relay connection unit receives a plurality of messages from a plurality of buses or/and one bus. Based on a plurality of the messages, the relay connection unit generates a plurality of new messages and sends the generated messages to message receivers of other buses. That is, there are many cases where a plurality of message groups for generating new messages respectively is present.

In sending and receiving messages by CAN communication, as described above, the message transmitters consisting of the ECUs and the sensors are capable of sending messages respectively when the buses to which the message transmitters are connected are in an open state. Thus the relay connection unit frequently asynchronously receives messages sent from the message transmitters via the buses.

When there is a big difference in reception timings of messages, sent from a plurality of the message transmitters belonging to message groups respectively, which are used to generate new messages, there arises a problem that it is impossible to send new messages generated based on the messages to other buses at desired timings.

There is another problem that in observing the period of timings at which the new messages are sent, instead of a message whose reception is delayed, it is necessary to generate a new message by using a message received one time previously.

Non-patent document: Introduction to CAN published on Oct. 1, 2003, publisher: Renesas Technology Internet (URL: http://www.renesas.com/jpn/products/mpumcu/specific/can_lin_mcu/candoc/rjj99z0001_entry_0400.pdf)

SUMMARY OF THE INVENTION

Problem to be Solved by the Invention

The present invention has been made in view of the above-described problems. It is an object of the present invention to prevent timings at which new messages are generated and sent from being delayed when a relay connection unit generates the new messages based on messages received from message transmitters connected to a plurality of buses or/and a plurality of the message transmitters connected to one bus and sends the new messages to message receivers.

Mean for Solving the Problem

To solve the above-described problem, the present invention provides a vehicle communication system comprising a relay connection unit relaying not less than one bus connected to message transmitters and a bus connected to a message receiver to each other, wherein based on a plurality of messages received from the message transmitters, the relay connection unit generates a new message and sends the generated message to the message receiver via the bus; a number of the messages to be generated is not less than one, and of a plurality of messages, messages for generating each message are divided into groups; and sending timings of a plurality of same-group messages, for generating one of the new messages, received by the relay connection unit from the message transmitters are gradually approached to each other.

By approaching the reception timings of a plurality of messages for generating the new message to each other as much as possible, delay in sending the generated new message is restrained. Of messages to be received by the relay connection unit, reception timings of messages other than a plurality of the messages for generating the one new message and those of messages belonging to other groups are gradually made distant from each other.

A parent message and a child message are set for each group; sending timings of the child messages belonging to the same group is so controlled as to be gradually close to that of the parent message. Sending timings of the parent messages belonging to different groups are so controlled as to be gradually distant from each other.

The relay connection unit is connected to a plurality of buses connected to message transmitters respectively or/and one bus connected to a plurality of message transmitters;

the relay connection unit has sending/receiving parts connected to the buses respectively and a relay processing part generating a new message, based on a plurality of messages received from a plurality of the message transmitters;

a parent message which requests sending of child messages for generating the new message is sent from the relay connection unit to the message transmitters which send the child messages respectively or the parent message is sent from one of a plurality of the message transmitters connected to the one bus to the other message transmitters; and the message transmitters which send the child messages respectively have a sending timing operation part respectively for gradually approaching sending timings of the child messages periodically sent to the relay connection unit to the reception timing of the parent message based on a reception timing of the parent message and in response to the parent message and making sending timings of child messages of parent messages of other groups and the messages other than the child messages gradually distant from reception timings of the parent message.

That is, a plurality of messages necessary for the relay connection unit to generate a new message is specified as the "child message", while a message requesting the sending of the child message to the relay connection unit is specified as the "parent message". The "child message" and the "parent message" are distinguished from many other messages to be sent and received via buses. In this manner, the relationship between the "child message" and the "parent message" are specified.

In a case where a plurality of message transmitters which send the child messages respectively to the relay connection unit is connected to different buses, the parent message is sent from the relay connection unit to the message transmitters which send the child messages respectively.

In a case where a plurality of message transmitters which send the child messages respectively to the relay connection unit is connected to one bus, the parent message may be sent from one of a plurality of the message transmitters connected to the one bus to other message transmitters. In this case, the parent message may be sent from the relay connection unit.

The message transmitter means devices sending the child message to the relay connection unit and consists of a control unit, an actuator, a sensor, and the like.

The message receiver which receives a new message generated by the relay connection unit consists of an electronic control unit or the actuator.

As described above, when timings at which a plurality of the message transmitters send the child message respectively to the relay connection unit are gradually approached to the reception timing of the parent message, reception timings of a plurality of child messages at which the relay connection unit receives are allowed to be nearly simultaneous with each other. Thus there is no delay in the reception timings of the child messages.

Therefore based on the newest child message, the relay connection unit always generates the new message and is capable of periodically sending the new message to the message receiver. Thereby it is possible to prevent delay in the sending timing.

As described above, in sending the parent message from the relay connection unit to the message transmitters connected to a plurality of the buses respectively or/and each of a plurality of message transmitters connected to one bus in order for the relay connection unit to generate the new message, it is preferable that the sending timing at which the parent message is sent is set by a timer provided on the relay connection unit or periodical reception of messages from the bus connected to the message receiver is set as a trigger. The received message set as the trigger has a sending period which is coincident with the sending period of the parent message P or is a divisor.

It is preferable that the parent message sent from the relay connection unit has a small CANID and a high communication priority and that a plurality of message transmitters sending the child messages respectively is capable of simultaneously receiving the parent message.

The parent message sent from the relay connection unit has short frame data or does not have frame data.

Because the parent message only requests the sending of the child message, it is preferable that the data length thereof is set as short as possible or the parent message does not have data (DLC=0).

When the relay connection unit generates the new message, based on a plurality of child messages received from a plurality of message transmitters connected to one bus, the parent message may be sent from one of a plurality of the message transmitters having a sending/receiving function to other message transmitters. In this case, it is preferable that the parent message sent from the one message transmitter has a small CANID, a high priority, and a short sending period.

That is, one of a plurality of the message transmitters connected to one bus serves as the message transmitter sending the parent message. The message used as the parent message is the child message sent to the relay connection unit. By gradually approaching the sending timings of the child messages sent from the other message transmitters to the relay connection unit to the sending timing of the parent message, the relay connection unit is capable of generating the new message.

As described above, it is preferable that the message used as the parent message has a smaller message ID, a higher priority, and a shorter sending period than any other child message sent from a plurality of the message transmitters to the relay connection unit.

When the message to be used as the parent message has a small ID, the message has a high communication priority. Thereby the child message can be sent to the relay connection unit in preference to other messages. When the message to be used as the parent message is short in its sending period, it is possible to set child messages sent from a plurality of other message transmitters to the relay connection unit as greatest common divisors or set the sending periods of the child messages as integral (N) multiples of the sending period of the parent message.

Effect of the Invention

As described above, according to the vehicle communication system of the present invention, the relay connection unit is capable of receiving child messages, for generating the new messages, sent from a plurality of message transmitters as synchronous messages. Therefore it is possible to prevent the sending of the new messages from being delayed.

BRIEF DESCRIPTION OF THE DRAWINGS

FIG. 1 shows a first embodiment of a vehicle communication system of the present invention.

FIG. 4 is an explanatory view of an operation principle of a sending timing operation part of approaching sending timings of child messages to that of a parent message, in which FIG. 4(A) shows a case where the parent message is sent later than the child message, FIG. 4(B) shows a case where the parent message is sent earlier than the child message, and FIG. 4(C) shows the case where the processing of generating the message C is executed after the child message B is received and the message C is sent to the bus after the elapse of a generation period of time tp from the reception time of the child message B.

FIG. 12 shows a fourth embodiment of the present invention.

EXPLANATION OF REFERENCE NUMERALS AND SYMBOLS

Figure 2A:
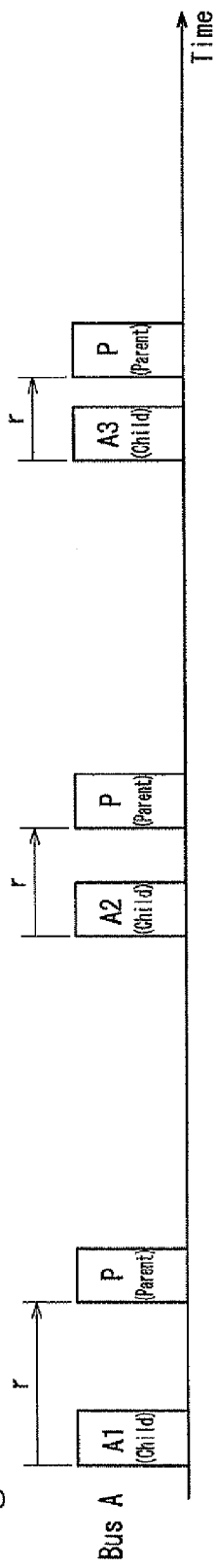
FIG. 2 is an explanatory view of a sending timing in a case where sending timings of child messages are gradually approached to that of a parent message.

10: vehicle communication system
11(11A, 11B, 11C): bus
20: relay connection unit
22: relay processing part
30 (30A through 30J): electronic control unit (ECU)
32: sending timing operation part
50A, 50B: communication function-provided sensor
50C: actuator function-provided ECU
P: parent message
A, B: child message
C: new message
X: Parent messages or child messages of other groups and messages other than parent messages and child messages of other groups

BEST MODE FOR CARRYING OUT THE INVENTION

The embodiments of the present invention are described below with reference to the drawings.

FIGS. 1 through 9 show the first embodiment of the present invention.

A communication system 10 of the present invention has a plurality of electronic control units (ECU) 30 (30A, 30B, and 30C) connected to a plurality of buses 11 (11A, 11B, and 11C) respectively and a relay connection unit 20, interposed between the buses 11, which periodically generates a new message based on a plurality of messages periodically received from the ECU 30A, 30B via the buses 11A, 11B and relays the generated new message to the ECU 30C connected to the bus 11C. CAN (Control Area Network) is used as the communication protocol of the bus 11.

The relay connection unit 20 has a sending/receiving part 21 (21A, 21B, and 21C) and a relay processing part 22.

The sending/receiving part 21A, 21B, and 21C are connected to the buses 11A, 11B, and 11C respectively to receive messages from the buses 11A through 11C and send messages thereto respectively.

The relay processing part 22 is connected to each sending/receiving part 21 and periodically sends parent messages P to the ECUs 30A, 30B, connected to the buses 11A and 11B respectively, which function as a message transmitter respectively. The parent message P has an ID part. The length of a data part of the parent message P is set to zero. In a message transmission, the priority of the parent message is set higher than that of the child message.

The parent message P is periodically sent by using a timer in the first embodiment.

The relay processing part 22 periodically receives the child messages A, B from the ECUs 30A, 30B respectively and generates a new message C which is a synchronous message on the basis of the data of the child messages A, B, thus relaying the new message C to the ECU 30C functioning as a message receiver.

The ECU 30A has a sending/receiving part 31 and a sending timing operation part 32. In FIG. 1, although the sending/receiving part 31 of the ECU 30A and the sending timing operation part 32 thereof are shown, the ECU 30B has also the sending/receiving part 31 and the sending timing operation part 32.

The ECUs 30A and 30B have a sending/receiving function respectively. Based on the received parent message P sent from the relay connection unit 20, the ECUs 30A and 30B send the child messages A, B respectively. In the present invention, the ECUs 30A and 30B function as the message transmitter sending the child message.

Because the ECU 30C connected to the bus 11C has also the sending/receiving part 31 and receives the new message from the relay connection unit 20, the ECU 30C functions as the message receiver in the present invention. Because the ECU 30C does not receive the child message in the first embodiment, the ECU 30C does not have the sending timing operation part 32, but has a processing part (unshown) for the message C received from the relay connection unit 20.

As described above, the sending/receiving part 31 of the ECU 30A (30B) receives the parent message P sent from the relay connection unit 20 and sends a child message A via the bus 11.

Although the detail of the sending timing operation part 32 is not described herein, the operation of the sending timing operation part 32 is so set that a sending timing of the child message to be periodically sent to the relay connection unit 20 gradually approaches the reception timing of the parent message P based on the reception timing of the parent message P sent from the relay connection unit 20 and in response to the parent message P.

By classifying messages other than the child message into some groups, a parent-child relationship is defined. The parent message defined herein is called P'. The sending timing of the parent message P' and that of the parent message P, namely, the parents of different groups are gradually made distant from each other, whereas the child messages are gradually approached to only the parent thereof.

The principle of the present invention is described below with reference to FIGS. 2 and 3.

As described above, the operation of the ECUs 30A and 30B is so set that the sending timings of the child messages A and B gradually approach to the reception timing of the parent message P to be periodically sent to the ECUs 30A and 30B from the relay connection unit 20.

Figure 2B:
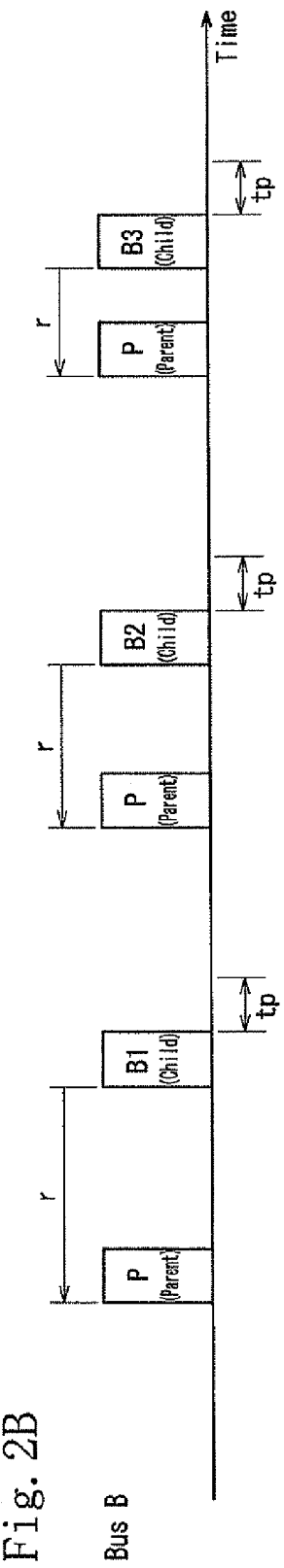
Figure 3:
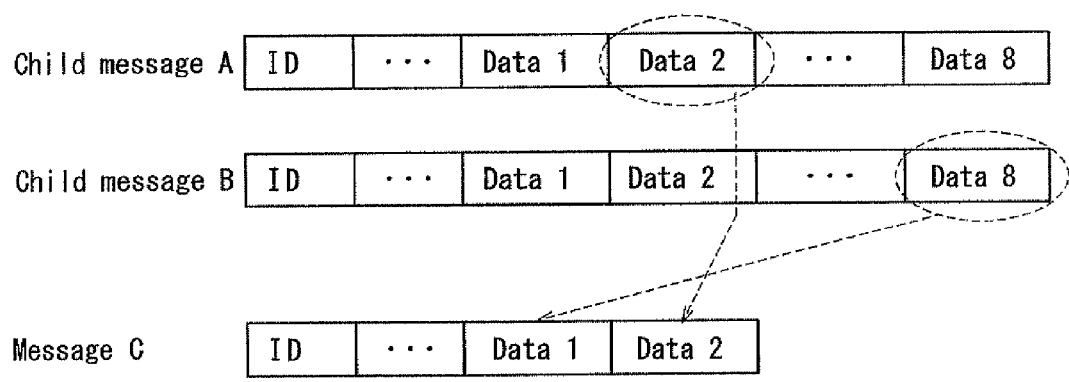
FIG. 3 is an explanatory view showing a case where a new message is generated based on a child message.

As shown in FIGS. 2(A), 2(B), the relay connection unit 20 sends the parent message P to the buses 11A and 11B nearly simultaneously and periodically. At this time, the sending timing operation part 32 of each of the ECUs 30A and 30B adjusts the sending timings of the child messages A and B such that the time lag r between the parent message P and the child messages A and B becomes gradually shorter with the elapse of time.

The relay processing part 22 of the relay connection unit 20 generates the new message C, based on the child messages A and B. FIG. 3 is an explanatory view of the generation of a message. The message has the ID part and the data part. In an example shown in FIG. 3, data 2 of the child message A and data 8 of a child message B are taken out to set them as the data part of the new message C.

Figure 2C:
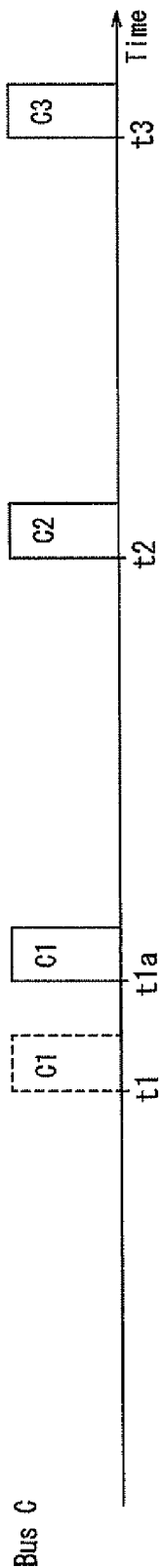

As shown in FIG. 2(C), the relay processing part 22 of the relay connection unit 20 executes the processing of generating the message C after it receives the child message B and sends the message C to the bus 11C after the elapse of a generation period of time tp from the reception time of the child message B.

That is, the generation period of time tp is the period of time from the time when the message C is generated upon reception of the child messages A and B till the time when the message C is sent.

In this manner, the relay processing part 22 of the relay connection unit 20 generates a message C1 based on child messages A1 and B1, a message C2 based on child messages A2 and B2, and a message C3 based on child messages A3 and B3, thus sending the messages C to the ECU 30.

It is necessary for the relay processing part 22 of the relay connection unit 20 to send the message C generated thereby to the ECU 30C periodically at a predetermined sending timing.

As shown in FIG. 2(C), the relay connection unit 20 sends the message C to the ECU 30C at timings of times t1, t2, and t3.

When the messages A1 and B1 are sent from the ECU 30A and 30B respectively at timings distant from that of the parent message P, the time t1 at which the message C1 is sent elapses before the relay processing part 22 of the relay connection unit 20 finishes the reception of the message B1.

Therefore the message C1 can be generated at a time t1a when the generation period of time tp has elapsed from the reception time of the message B1. Thus the message C1 cannot be sent at the set sending timing t1. Otherwise the message C1 is generated by using the message B received one time previously and is sent at the time t1.

To solve the above-described problem, in the present invention, the messages A2 and B3 and the messages A3 and B3 are sent at timings closer to the parent message P than the timing at which the messages A1 and B1 are sent, and the relay connection unit 20 generates the messages C2 and C3 earlier than the times t2 and t3 and sends the messages C2 and C3 to the bus 11C at set sending timings.

As described above, the sending timing of the child messages to be periodically sent from the ECUs 30A and 30B to the relay connection unit 20 is gradually approached to the reception timing of the parent message P based on the reception timing of the parent message P and in response to the parent message P. Thereby the message C can be sent to the bus 11C at the set timing.

The sending timings of messages other than the child messages to be periodically sent from the ECU 30A, 30B to the relay connection unit 20 and those of child messages belonging to other groups are made gradually distant from that of the parent message P. In this manner, child messages which receive the parent message P can be sent prior to the messages other than the child messages.

The adjustment of the sending timing of the ECUs 30A and 30B which send the child messages A and B respectively is described in detail below.

Although an example in which the ECU 30A adjusts the sending timing of the child message A in relation to that of the parent message P is described below, a case in which the ECU 30B adjusts the sending timing of the child message B is similar.

The sending timing operation part 32 of the ECU 30A always monitors the sending interval between the child messages A. As shown in FIG. 4, supposing that a closest sending interval between the child messages A is To, a next sending interval Tnext is set as Tnext=To+F. That is, the Tnext is finely adjusted by an amount F called a "force".

At this time, as shown in FIG. 4(A), when the parent message P is sent later than the child message A, by setting F as F>0, the sending interval Tnext is longer than To. Thus the sending timing of the child message A becomes close to the sending timing of the parent message P. That is, a time lag r between the sending timing of the parent message P and that of the child message A becomes short.

That the parent message P is sent later than the child message A means that the sending timing of the parent message P temporally time lags behind that of the child message A. That the parent message P is sent prior to the child message A means that the sending timing of the parent message P is temporally earlier than that of the child message A.

Comparing the parent message P prior to the child message A by one message with the child message A, as shown in FIG. 4(A), the sending timing of the parent message P is prior to that of the child message A. By comparing a time lag between the parent message P prior to the child message A by one message and the child message A with a time lag between the parent message P subsequent to the child message A by one message and the child message A, a shorter time lag is adopted as the time lag r to be used by the sending timing operation part 32. The method of adjusting the sending timing shown in FIG. 4(B) is similar to the above-described method.

As shown in FIG. 4(B), when the parent message P is sent prior to the child message B, F is set as F<0. Thereby the sending interval Tnext becomes shorter than To. Therefore the sending timing of the child message B becomes close to the sending timing of the parent message P. That is, the time lag r between the parent message P and the child message B becomes short.

A state in which other message becomes close to one message is expressed as "an attractive force works". That is, the attractive force works on the parent message from the child message.

With reference to FIG. 5, a method of making sending timings of messages other than the child message and those of the child messages X belonging to other groups distant from that of the parent message P is described below.

The sending timing operation part 32 of the ECU 30A adjusts the sending interval between the messages X other than the child message such that the sending timing of the messages X other than the child message is distant from that of the parent message P. The closest sending interval between the messages X is set to To.

Figure 5A:
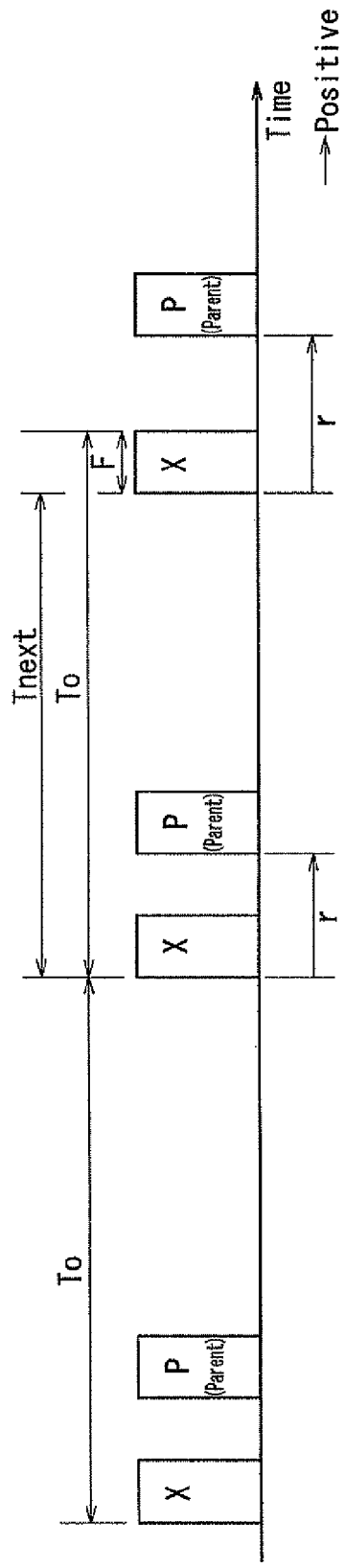
FIGS. 5(A) and 5(B) are explanatory views of the operation principle of the sending timing operation part of making sending timings of messages other than the child messages distant from that of the parent message.

As shown in FIG. 5(A), when the parent message P is sent later than the message X, by setting F as F<0, the sending interval Tnext becomes shorter than To. Thus the sending timing of the message X becomes distant from that of the parent message P. That is, the time lag r between the sending timing of the message X and that of the parent message P becomes long.

Figure 5B:
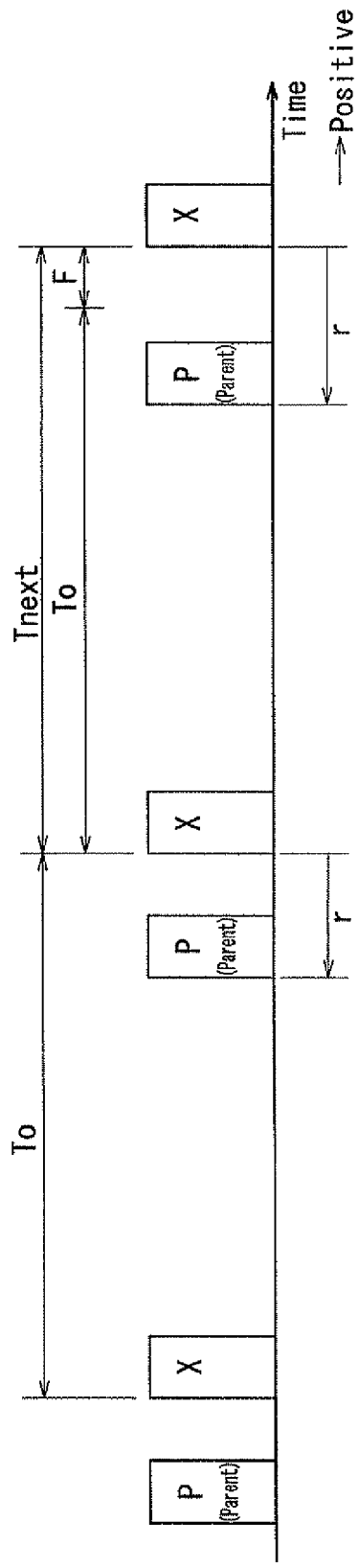

As shown in FIG. 5(B), when the parent message P is sent earlier than the message X, by setting F as F>0, the sending interval Tnext becomes longer than To. Thus the sending timing of the message X becomes distant from that of the parent message P. That is, the time lag r between the sending timing of the parent message P and that of the message X other than the child message becomes long.

A state in which the other message becomes distant from one message is expressed as "a repulsive force works". That is, the repulsive force works on the parent message P from the message X.

The parent messages P are present forward and rearward from the message X. The shorter time lag r between the message X and the parent message P is selected. In FIG. 5, a case in which the message X and the parent messages P are not greatly distant from each other is described. In a case where the message X and the parent message P are greatly distant from each other, the shorter time lag r between the message X and the parent message P is selected. Therefore the message X other than the child message and the parent message P become gradually distant from each other and the sending timing becomes stable when r≈To/2.

The above-described contents are as described below, when they are generally described.

The next sending interval Tnext of each message is set as Tnext=To+F in relation to the closest sending interval To. That is, the sending interval is finely adjusted by means of the force F.

Regarding the time lag r between the sending timing of the child message to be sent from the ECU 30 and that of the parent message P, the time lag in a case where the parent message P is sent later than the child message is defined as a positive direction time lag.

At this time, the force F is the attractive force when the time lag r is positive, the force F is positive, and when the time lag r is negative, the force F is negative. The force F is the repulsive force when the time lag r is positive, the force F is negative, and when the time lag r is negative, the force F is positive.

The force is expressed in the form of F(r) as a function of the time lag r. The force F(r) is selected as follows:

In the case where the force F is the attractive force, in the neighborhood of r=0, when r>0, F>0, and when r<0, F<0. In the case where the force F is the repulsive force, when r>0, F<0, and when r<0, F>0. When the absolute value |r| of the time lag r is sufficiently large, the absolute value |F| of the force F attenuates in proportion to the absolute value |r| of the time lag r.

When the time lag r is ±∞ (infinite in positive and negative directions), the force F(±∞)=0.

The force F of each message is set as follows:

The force F of the child message is so set that the attractive force or the repulsive force works on the parent message from the child message.

Figure 6:
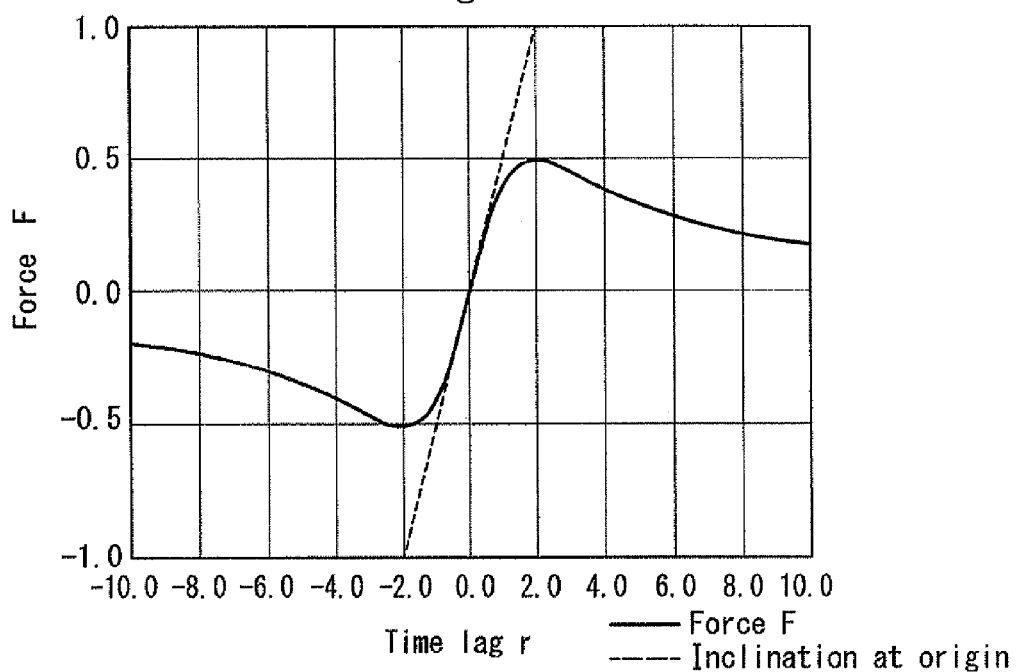
FIG. 6 is an explanatory view showing the relationship between a time lag and a force in which G=1 and g=2.

FIG. 6 is an explanatory view showing an example indicating the relationship between the time lag r and the force F. In the example of FIG. 6, the force $F(r)=2 \cdot G \cdot r/(r^2+g^2)$, where G=1 and g=2.

At this time, as described above, when the time lag r is 0, the force F(0)=0. In the case where the force F is the attractive force, in the neighborhood of r=0, when r>0, F>0, and when r<0, F<0. When the absolute value |r| of the time lag r is sufficiently large, the absolute value |F| of the force F attenuates in proportion to the absolute value |r| of the time lag r. When the time lag r is ±∞, the force F(±∞)=0.

Figure 7:
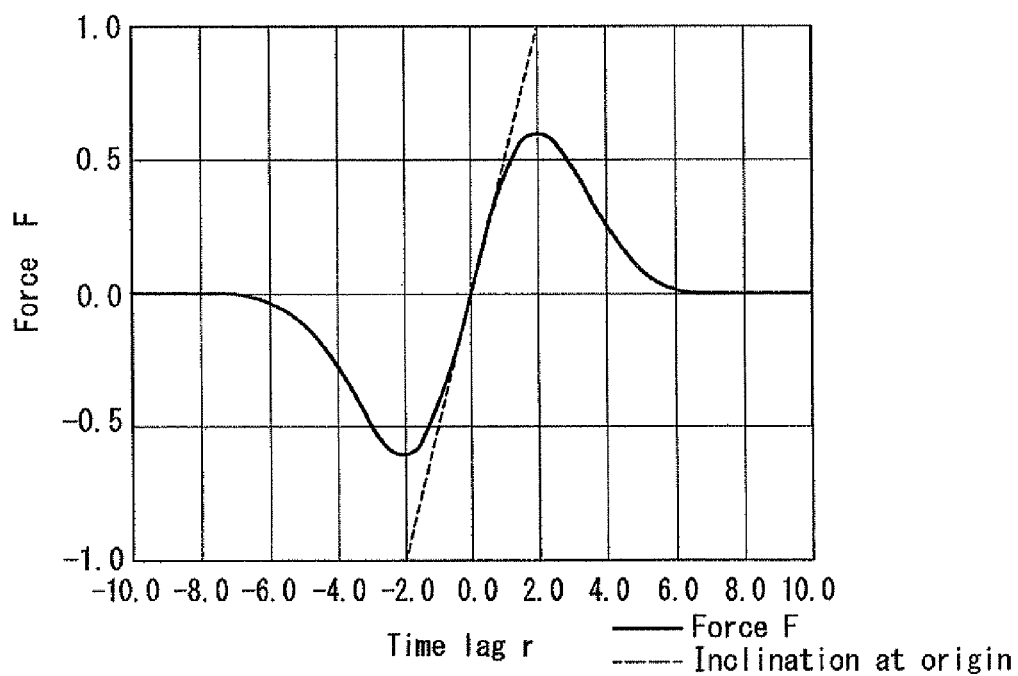
FIG. 7 is an explanatory view showing the relationship between the time lag and the force in which G=2 and g=2.

FIG. 7 shows a case in which the force $F(r)=G \cdot (r/g^2) \cdot \exp(-r^2/(2 \cdot g^2))$, where G=2 and g=2.

Figure 8:
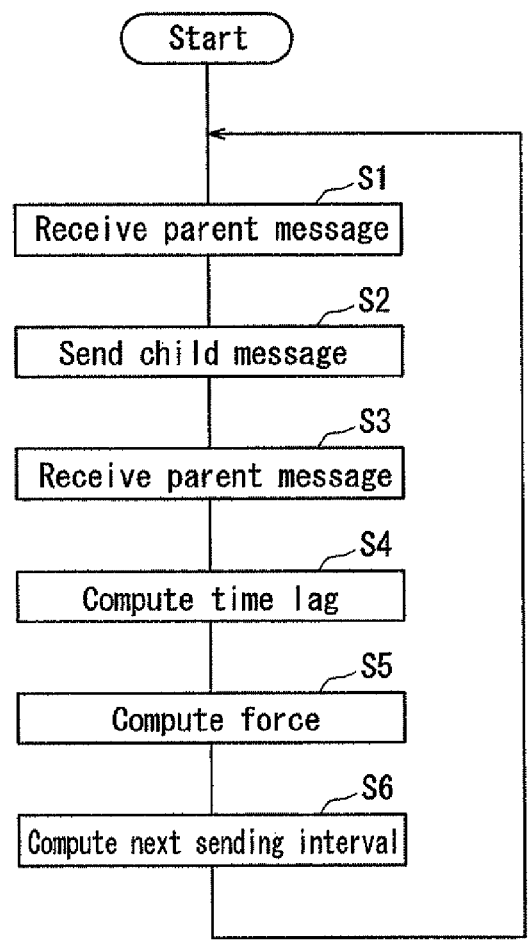
FIG. 8 is a flowchart showing the operation of the sending timing operation part.

The operation of adjusting the sending timing of the child message to be sent from the ECU 30 is described below with reference to the flowchart of FIG. 8 by exemplifying the operation of adjusting the sending timing of the child message to be sent from the ECU 30A.

The sending timing operation part 32 of each ECU 30 periodically sends the child message to the bus 11 and computes the sending period To. FIG. 8 shows an operation of sending the parent message P later than the child message A.

At step S1, the ECU 30A receives the parent message P the relay connection unit 20 has sent. The sending timing operation part 32 judges whether the received message is the parent message P or not according to the ID (identifier) described on the parent message P.

At step S2, the ECU 30A sends the child message A via the sending/receiving part 21.

At step S3, the ECU 30A receives the next parent message P.

At step S4, the sending timing operation part 32 computes the time lag r from the timing at which the child message A2 has been sent and the timing at which the parent message P has been received. As the time lag r, a smaller time lag of a time lag found from the reception timing of the parent message P observed at step S1 and a time lag found from the reception timing of the parent message P observed at step S3 is adopted.

At step S5, the sending timing operation part 32 computes the force F by using the time lag r.

At step S6, the sending timing operation part 32 computes the next sending interval Tnext.

The program returns to step S1 at which the next child message A is sent after the elapse of the sending interval Tnext from the sending timing of the child message A sent at step S2.

The operation of the ECU 30B which sends the child message is similar to that of the ECU 30A.

According to the present invention, when the relay connection unit 20 simultaneously sends the parent messages P to the buses 11, the message transmitter which has received the parent message P makes the sending timing of the child message gradually closer to the reception timing of the parent message P, whereas the message transmitter makes the sending timing of the child messages of other groups and the message X other than the child messages gradually distant from the reception timing of the parent message P. Therefore the message transmitters connected to the buses 11 send the child messages nearly simultaneously, and the relay connection unit 20 receives the child messages nearly simultaneously.

Therefore based on the newest child message, the relay connection unit 20 always generates the new message and is capable of preventing the timing at which the new message is sent to the bus 11C from being delayed.

Figure 9:
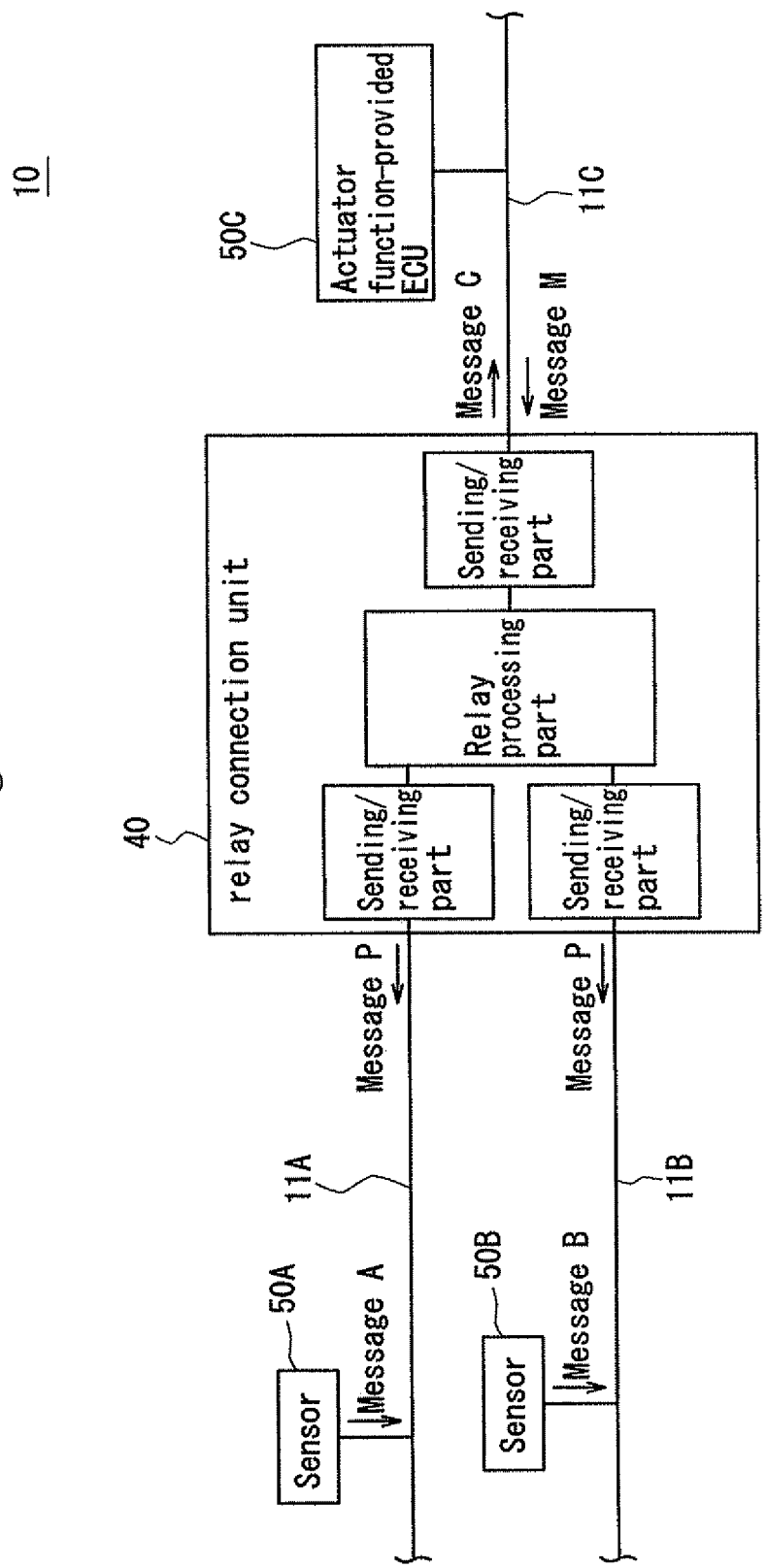
FIG. 9 shows a second embodiment of the present invention.

FIG. 9 shows the second embodiment of the present invention.

In the vehicle communication system 10 of the second embodiment, the message transmitter consists of a sensor or a switch. That is, the relay connection unit 20 relays communication function-provided sensors 50A and 50B connected to the buses 11A and 11B respectively and the bus 11C to which an actuator function-provided ECU 50C is connected to each other. Based on a plurality of child messages A and B periodically received from the sensors 50A and 50B respectively via the buses 11A and 11B, the relay connection unit 20 periodically generates the new message C and relays the message C to the actuator function-provided ECU 50C connected to the bus 11C.

Data measured by the sensors 50A and 50B is included in the child messages A and B to be sent from the sensors 50A and 50B. The sensor 50 consists of front and rear wheel speed sensors, door opening and closing switches, and the like.

In the second embodiment, the sending timing of the parent message P to be sent from the relay connection unit 20 is set not by using the timer of the first embodiment, but by using a message M received from the bus 11C as a trigger. That is, by using a message M sent to the relay connection unit 20 from the ECU 50C connected to the bus 11C or other message M received from the bus 11C as triggers, the relay connection unit 20 sends the parent message P to the buses 11A and 11B. The message M has a sending period which is coincident with the sending period of the parent message P sent from the relay connection unit 20 or is a divisor.

The relay connection unit 20 sends the parent message P to the buses 11A, 11B, and the sensors 50A, 50B make the sending timings of the child messages A and B gradually close to the reception timing of the parent message P. Therefore based on the newest child message, the relay connection unit 20 always generates the new message and is capable of sending the new message to the actuator function-provided ECU 50C.

Because other constructions and the operation and effect of the second embodiment are similar to those of the first embodiment, the same parts of the second embodiment as those of the first embodiment are denoted by the same reference numerals and symbols as those of the first embodiment, and description thereof is omitted herein.

Figure 10:
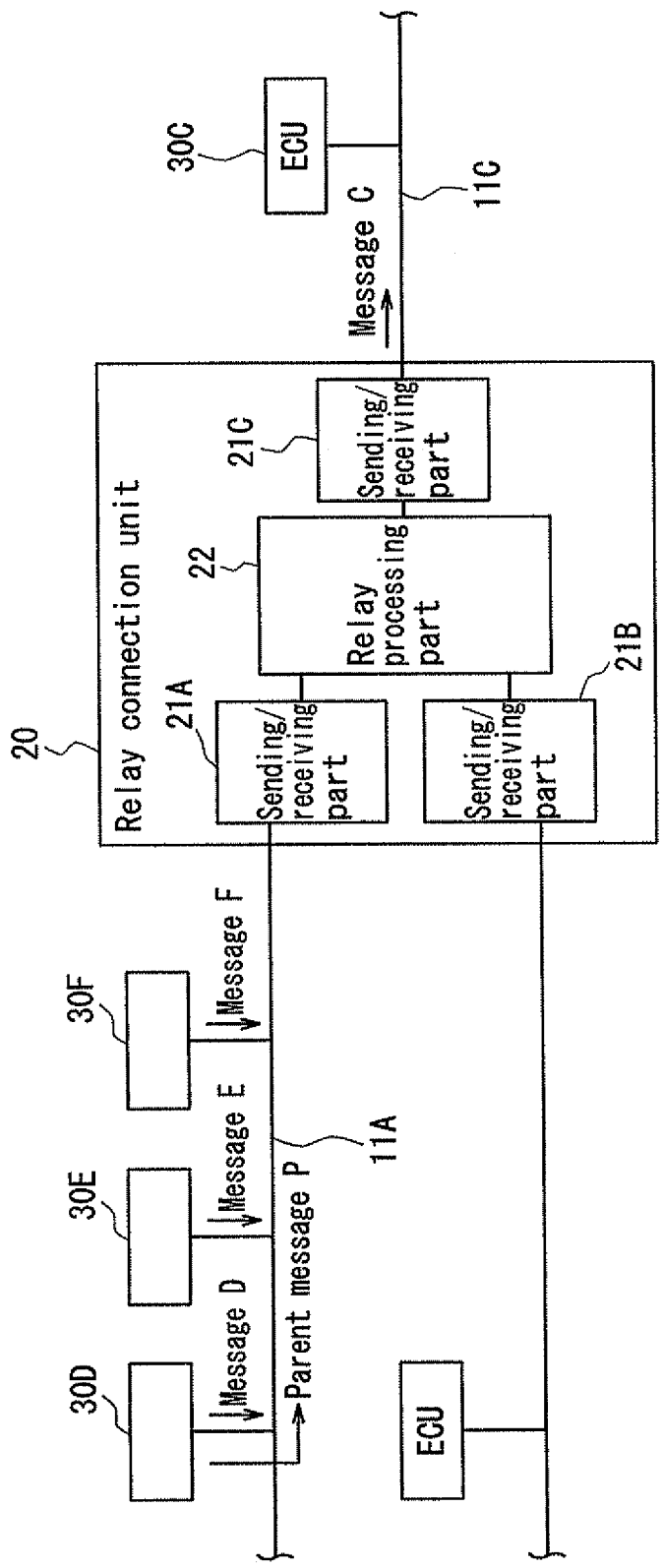
FIG. 10 shows a third embodiment of the present invention.

FIG. 10 shows the third embodiment of the present invention.

In the third embodiment, a plurality of ECUs 30D through 30F is connected to one bus 11A connected to the relay connection unit 20. Based on child messages D, E, and F received from the ECUs 30D through 30F respectively, the relay connection unit 20 generates one new message C and sends the message C to the ECU 30C functioning as a message receiver via the bus 11C.

In this case, of messages sent from the ECU 30D to the relay connection unit 20, a message having a low CANID, a high communication priority, and a short sending period is set as the parent message P to be sent to the other ECUs 30E and 30F.

That is, in the third embodiment, the parent message P is not sent from the relay connection unit 20, but the ECU 30D selected from among a plurality of the message transmitters (ECUs 30D through 30F) connected to one bus 11A and having a sending/receiving function of sending the child message to the relay connection unit 20 is set as the sending source of the parent message P.

When the other ECUs 30E and 30F receive the parent message P from the ECU 30D, a sending timing operation part (not shown) provided for the ECUs 30E and 30F performs an operation such that the sending timings of the child messages E and F sent from the ECUs 30E and 30F respectively to the relay connection unit 20 become gradually close to that of the message D. Thus the child messages D, E, and F received by the relay connection unit 20 are approximately synchronized. Thereby similarly to the first and second embodiments, based on the newest message, the relay connection unit 20 always generates the new message C and is capable of sending the message C to the actuator function— provided ECU 50C via the bus 11C.

Because other constructions of the third embodiment are similar to those of the first embodiment, the same parts of the third embodiment as those of the first embodiment are denoted by the same reference numerals and symbols as those of the first embodiment, and description thereof is omitted herein.

As described above, the ECU 30D sends the parent message to the other ECUs 30E, 30F. But of messages sent from the ECUs 30D, 30E, and 30F to the relay connection unit 20, the message P having a low CANID, a high communication priority, and a short sending period is set as the parent message. Thus when the message P is sent from the ECU 30E, the ECU 30E is the sending source of the parent message.

It is preferable that the sending period of the parent message is the greatest common divisor of the sending periods of the child messages to be sent from other ECUs to the relay connection unit 20. Otherwise it is preferable that the sending periods of the child messages are integral (N) multiples of the sending period of the parent message. N may be 1.

Figure 11:
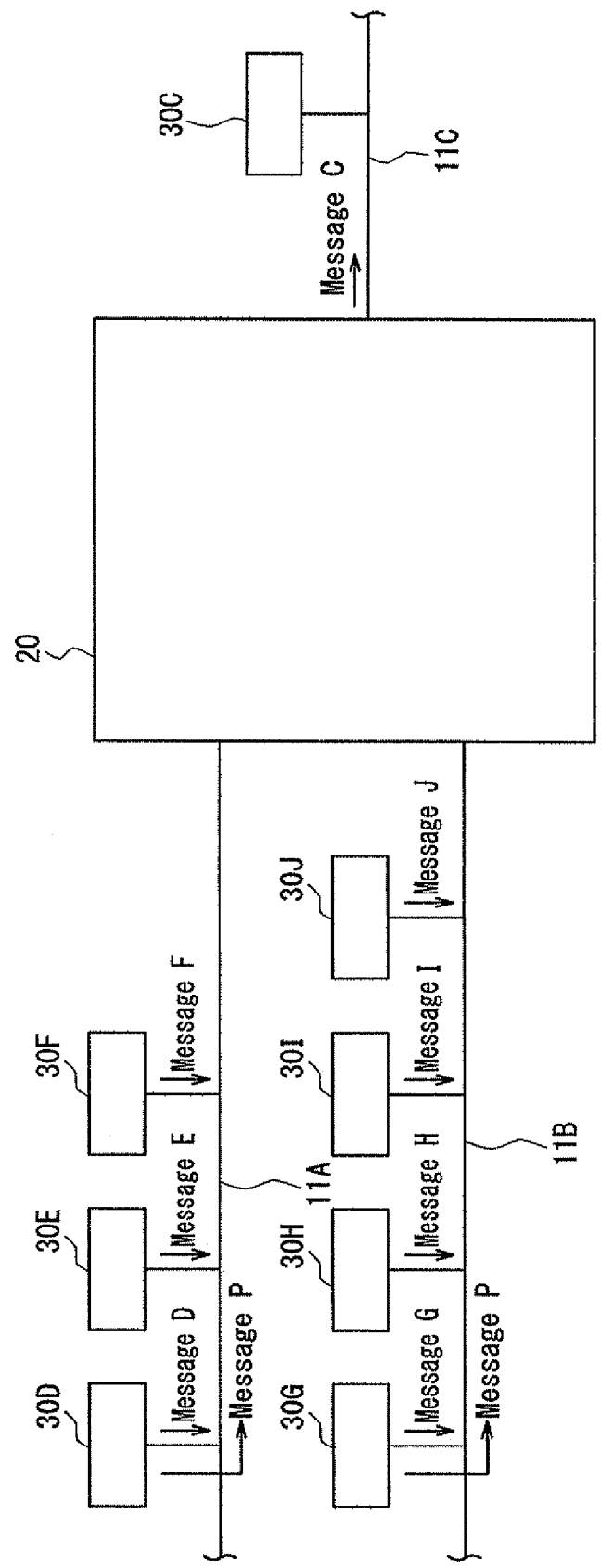
FIG. 11 shows a modification example of the third embodiment.

FIG. 11 shows a modification example of the third embodiment.

Similarly to the third embodiment, a plurality of ECUs 30G through 30J are connected to other bus 11B connected to the relay connection unit 20. When the relay connection unit 20 generates the new message C based on child messages G through J received from the ECUs 30G through 30J respectively, the message G sent to the relay connection unit 20 from the ECU 30G is set as the parent message P to be sent to the other ECUs 30H, 30I, and 30J.

Because other constructions of the modification example of the third embodiment are similar to those of the third embodiment, the same parts of the modification example of the third embodiment as those of the third embodiment are denoted by the same reference numerals and symbols as those of the third embodiment, and description thereof is omitted herein.

In the case where a plurality of message transmitters is connected to the buses 11A, 11B and other buses connected to the relay connection unit 20, and the new message C is generated based on the child messages received from a plurality of the message transmitters connected to one of the buses, the parent message is sent from one of the ECU connected to each bus.

FIG. 12 shows the fourth embodiment.

The fourth embodiment includes the first and third embodiments. Similarly to the first embodiment, the relay connection unit 20 generates a new message C1, based on the child messages A and B received from the ECUs 30A and 30B respectively connected to the buses 11A and 11B connected to the relay connection unit 20. Thus the parent message P is sent from the relay connection unit 20 to the ECUs 30A and 30B via the buses 11A and 11B respectively.

As described in the third embodiment, the relay connection unit 20 is connected to a bus 11D connected to a plurality of the ECUs 30D through 30F. Based on child messages D, E, and F received from the ECUs 30D through 30F respectively, the relay connection unit 20 generates a new message C2. The relay connection unit 20 does not send the parent message P to the bus 11D, but the message sent from the ECU 30D to the relay connection unit 20 is set as the parent message to be sent to the ECUs 30E and 30F.

The new messages C1, C2 generated by the relay connection unit 20 are sent to the ECU 30C via the bus 11C. When the relay connection unit 20 generates a plurality of new messages, the relay connection unit 20 adjusts the sending timing of the parent message C2 to be sent therefrom according to the priority of the messages C1 and C2.

The new message C2 may be sent to the message receivers of other buses.

In this case, supposing that the parent message to be sent to the bus 11A is Pa, that the parent message to be sent to the bus 11B is Pb, and that the parent message to be received from the bus 11D is Pd, it is possible to take an interval between the parent messages by applying a repulsive force to the parent message Pd from the parent messages Pa, Pb and level a processing load at the relay connection unit 20. Thereby it is possible to prevent the relay processing from being delayed. At this time, the timing of each child messages is so controlled that an attractive force works on each parent message.

What is claimed is:

1. A vehicle communication system comprising a relay connection unit relaying at least one bus connected to message transmitters and a bus connected to a message receiver,
wherein the relay connection unit generates a new message and sends the generated message to the message receiver based on a plurality of messages received from the message transmitters;
at least one new message is generated;

if a plurality of new messages are generated, messages for generating each new message are divided into groups;

timing intervals of a plurality of same-group messages that are sent to the relay connection unit for generating one of the new messages gradually decrease; and timing intervals of a plurality of different-group messages that are sent to the relay connection unit that are not used to generate the same new message gradually increase.

2. The vehicle communication system according to claim 1, wherein a parent message and a child message are set for each group;

timing intervals between same-group child messages and parent messages gradually decrease; and timing intervals between different-group parent messages gradually increase.

3. The vehicle communication system according to claim 1, wherein the relay connection unit is connected to a plurality of buses connected respectively to message transmitters, or one bus connected to a plurality of message transmitters;

the relay connection unit has at least one sending/receiving part connected to the buses respectively and a relay processing part generating a new message based on a plurality of messages received from a plurality of the message transmitters;

a parent message which requests sending of child messages for generating the new message is sent from the relay connection unit to the message transmitters which send the child messages respectively or the parent message is sent from one of a plurality of the message transmitters connected to the one bus to the other message transmitters; and the message transmitters which send the child messages have a sending timing operation part for gradually approaching sending timings of the child messages sent to the relay connection unit to the reception timing of the parent message and in response to the parent message.

4. The vehicle communication system according to claim 1, wherein the message transmitter is an electronic control unit, an actuator or a sensor; and the message receiver is an electronic control unit or an actuator.

5. The vehicle communication system according to claim 2, wherein the parent message is sent from the relay connection unit to the message transmitters connected to a plurality of the buses respectively or each of a plurality of the message transmitters connected to one bus.

6. The vehicle communication system according to claim 5, wherein a sending timing at which the parent message is sent from the relay connection unit is set by either (i) a timer provided on relay connection unit, or (ii) a trigger based on periodical reception of messages from the bus connected to the message receiver.

7. The vehicle communication system according to claim 5, wherein the parent message sent from the relay connection unit has a small CANID and a high communication priority or has short frame data or does not have frame data.

8. The vehicle communication system according to claim 2, wherein the relay connection unit generates a new message, based on a plurality of child messages received from a plurality of message transmitters connected to one bus; and the parent message is sent from one of a plurality of the message transmitters to other message transmitters; and the parent message to be sent from the one message transmitter has a small CANID, a high priority, and a short sending period.

\* \* \* \* \*